United States Patent
Jeon

(10) Patent No.: US 7,480,005 B2
(45) Date of Patent: Jan. 20, 2009

(54) DIGITAL CAMERA WITH A CAMERA ADJUSTING UNIT FOR EXTENSION AND RETRACTION OF A CAMERA BODY

(75) Inventor: Yeong-je Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 650 days.

(21) Appl. No.: 11/038,269

(22) Filed: Jan. 21, 2005

(65) Prior Publication Data

US 2005/0162545 A1 Jul. 28, 2005

(30) Foreign Application Priority Data

Jan. 26, 2004 (KR) ...................... 10-2004-0004834

(51) Int. Cl.
*H04N 5/225* (2006.01)
*H04N 9/04* (2006.01)
*H04N 5/222* (2006.01)
*G03B 17/04* (2006.01)

(52) U.S. Cl. ............. 348/373; 348/207.99; 348/333.06; 396/348

(58) Field of Classification Search ................. 348/373, 348/207.99, 333.06; 396/348
See application file for complete search history.

(56) References Cited

U.S. PATENT DOCUMENTS

| 4,958,178 | A | * | 9/1990 | Yoshida et al. | ................. | 396/85 |
| 5,822,638 | A | * | 10/1998 | Yoshida et al. | .............. | 396/349 |
| 5,915,140 | A | * | 6/1999 | Owashi | ...................... | 396/448 |
| 6,452,626 | B1 | * | 9/2002 | Adair et al. | ................. | 348/376 |
| 6,554,497 | B2 | * | 4/2003 | Kobayashi et al. | .......... | 396/348 |
| 6,667,771 | B1 | * | 12/2003 | Kweon | ....................... | 348/376 |
| 6,812,972 | B1 | * | 11/2004 | Silverbrook et al. | ........ | 348/373 |
| 6,924,838 | B1 | * | 8/2005 | Nieves | ........................ | 348/373 |
| 7,113,220 | B1 | * | 9/2006 | Misawa et al. | .............. | 348/373 |

* cited by examiner

*Primary Examiner*—Nhan T Tran
(74) *Attorney, Agent, or Firm*—Roylance, Abrams, Berdo & Goodman, L.L.P.

(57) ABSTRACT

A compact and light digital camcorder, according to an embodiment of the present invention, comprises a camcorder body, and a camera unit moving into and out from a top portion of the camcorder body in a length direction of the camcorder body. The camera unit comprises a camera adjusting unit, such that the camera unit is received in the camcorder body when not in use, and is protruded out from the camcorder body when in use.

16 Claims, 4 Drawing Sheets

DIGITAL CAMERA WITH A CAMERA ADJUSTING UNIT FOR EXTENSION AND RETRACTION OF A CAMERA BODY

CROSS-REFERENCE TO RELATED APPLICATIONS

This application claims the benefit under 35 U.S.C. §119(a) of Korean Patent Application No. 2004-4834, entitled "Digital Camcorder," filed Jan. 26, 2004, the entire disclosures of which are hereby incorporated by reference.

BACKGROUND OF THE INVENTION

1. Field of the Invention

The present invention relates to a camcorder. More particularly, the present invention relates to a portable camcorder that is compact, lightweight, portable, convenient to use, and prevents components thereof from damage.

2. Description of the Related Art

Generally, camcorders convert a moving image to an electric signal and record the electric signal on a predetermined storage medium. Recently, camcorders are being minimized in size and weight. As digital storage media develops, camcorders utilizing magnetic tape as a recording medium are gradually decreasing in use because they are bulky.

Since the inception of flash memory, a digital storage media, image photographing apparatuses such as the camcorder have been dramatically reduced in size. Flash memory consumes smaller amounts of electric power and is able to preserve stored information even when the power supply is switched off. Flash memory can be divided into two categories. A NAND flash memory stores a large capacity of data and NOR flash memory quickly processes data. NAND flash memory enables high integration, and therefore is generally used for storing sound and images.

A variety of camcorders using the aforementioned digital storage medium are under development. The size and weight of a camcorder operates as a significant factor for purchase by consumers, and accordingly, reduction of size and weight is important.

Accordingly, there is a continual need for smaller and lighter camcorders.

SUMMARY OF THE INVENTION

Accordingly, embodiments of the present invention provide a camcorder, using a digital storage medium, for storing still and moving images, that is smaller in size and lighter in weight than conventional camcorders.

The foregoing and other objects and advantages are substantially realized by providing a digital camcorder comprising a camcorder body having a longitudinal axis, and a power switch disposed thereon. A camera unit is movably positionable into and out of a top portion of the camcorder body along the longitudinal axis of the camcorder body, wherein the camera unit is substantially received in the camcorder body when not in use, and substantially protrudes out from the camcorder body when the power switch is pressed.

The camera adjusting unit comprises a plurality of guide bars mounted on the camcorder body for guiding extension and retraction of the camera unit. A plurality of guide pipes are disposed on the camera unit and correspond to the guide bars of the camcorder body for receiving the guide bars therein. A driving motor is provided for supplying power to the guide pipe.

The guide pipes comprise at least one power guide pipe having a rack gear thereon for transmitting power from the driving motor.

Other objects, advantages, salient features of the invention will become apparent to those skilled in the art from the following detailed description, which, taken in conjunction with the annexed drawings, discloses preferred embodiments of the invention.

BRIEF DESCRIPTION OF THE DRAWING FIGURES

The above aspect and other objects, features, and advantages of the present invention will become more apparent from the following description taken in conjunction with the accompanying drawings, in which.

Throughout the drawings like reference numerals will be understood to refer to like elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications to the embodiments described herein can be made without departing from the scope and spirit of the invention. Also, descriptions of well-known functions and constructions are omitted for conciseness.

Figure 1:
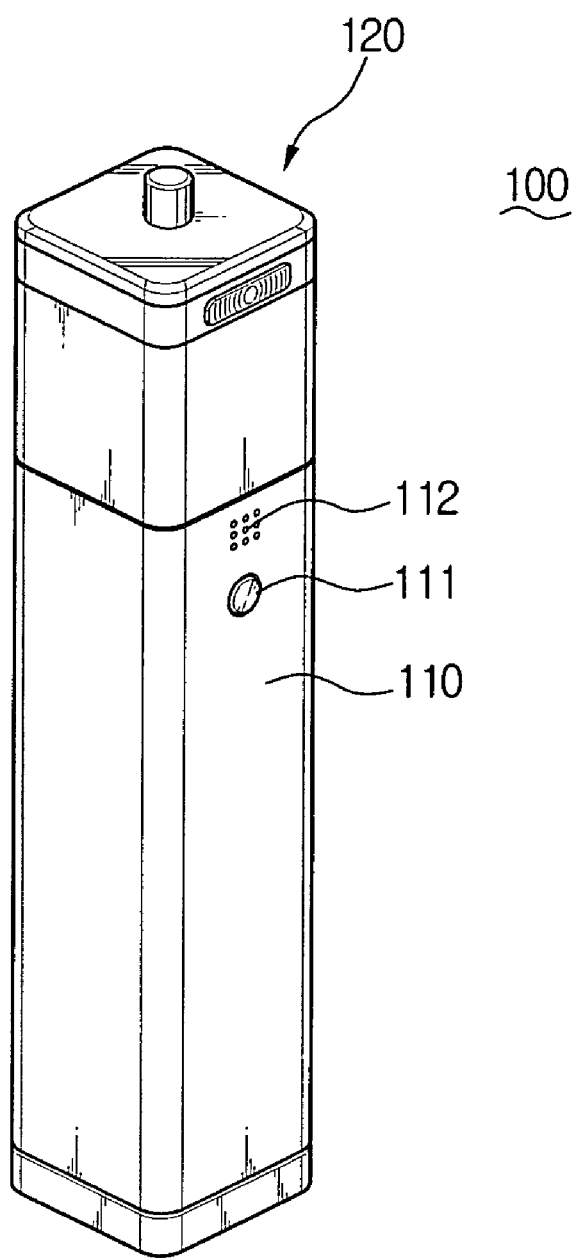
FIG. 1 is a perspective view of a digital camcorder in accordance with an embodiment of the present invention.

Referring to FIG. 1, a digital camcorder 100 according to an aspect of the present invention is illustrated. The digital camcorder 100 comprises a camcorder body 110 and a camera unit 120 that is positionable in and out of the camcorder body 110.

As shown in FIG. 1, the camcorder body 110 may be formed as a column shape and is preferably substantially about the size of a conventional lipstick container. The camcorder body 110 has a hollow recess formed in a top portion thereof for inserting the camera unit 120. The camcorder body 110 has a longitudinal axis (y).

The camcorder body 110 has a power switch 111 and a microphone 112 on a surface thereof. The power switch 111 functions to adjust movement of the camera unit 120.

For example, when being pressed for substantially about 2-3 seconds, the power switch 111 activates power to a camera adjusting unit 200 (FIG. 5) for moving the camera unit 120 up and down, thereby exposing the camera unit 120 to the outside of the camcorder body 110. The camera adjusting unit 200 (FIG. 5) comprises a guide bar 201, a driving motor 210 (FIG. 5), and a rack and a pinion correspondingly formed to each other on the camcorder body 110 and the camera unit 120, respectively, for converting a pivoting motion of the driving motor 210 to linear motion. A more detailed description about the camera adjusting unit 200 will be made herein below.

Figure 2:
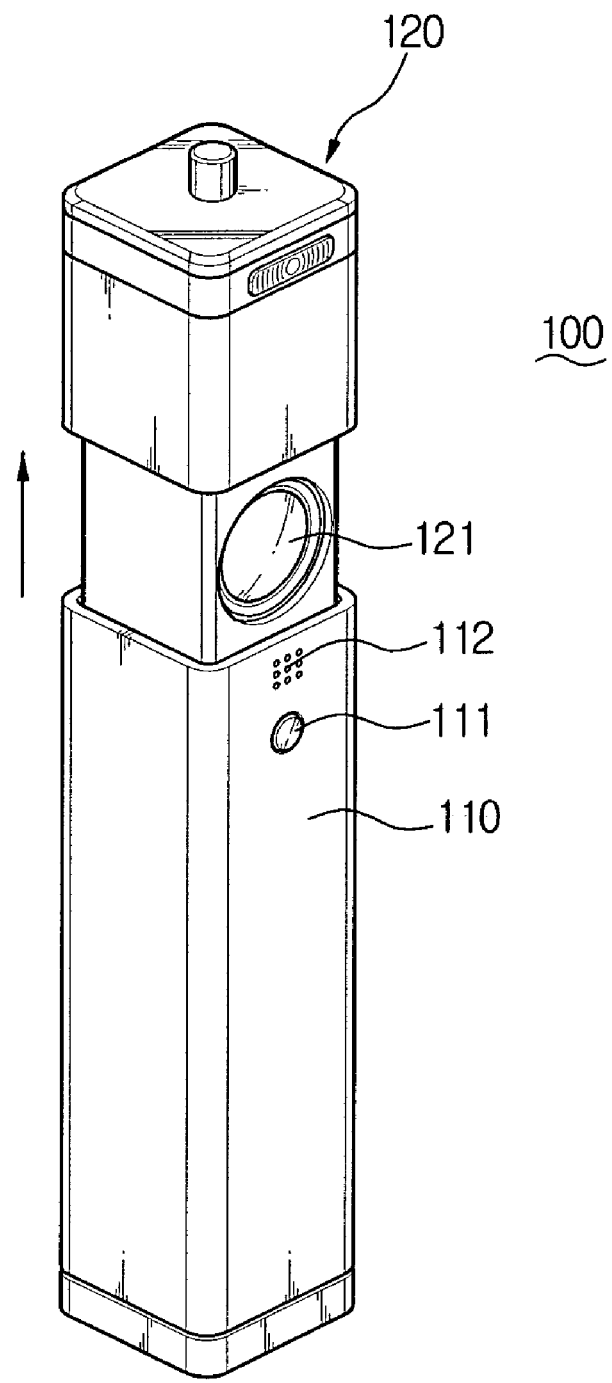
FIG. 2 is a perspective view of the digital camcorder of FIG. 1, with a camera unit thereof exposed.

As shown in FIG. 2, if the power switch 111 is pressed for substantially about 2-3 seconds, the camera unit 120 is elevated to a position for photographing.

Figure 3:
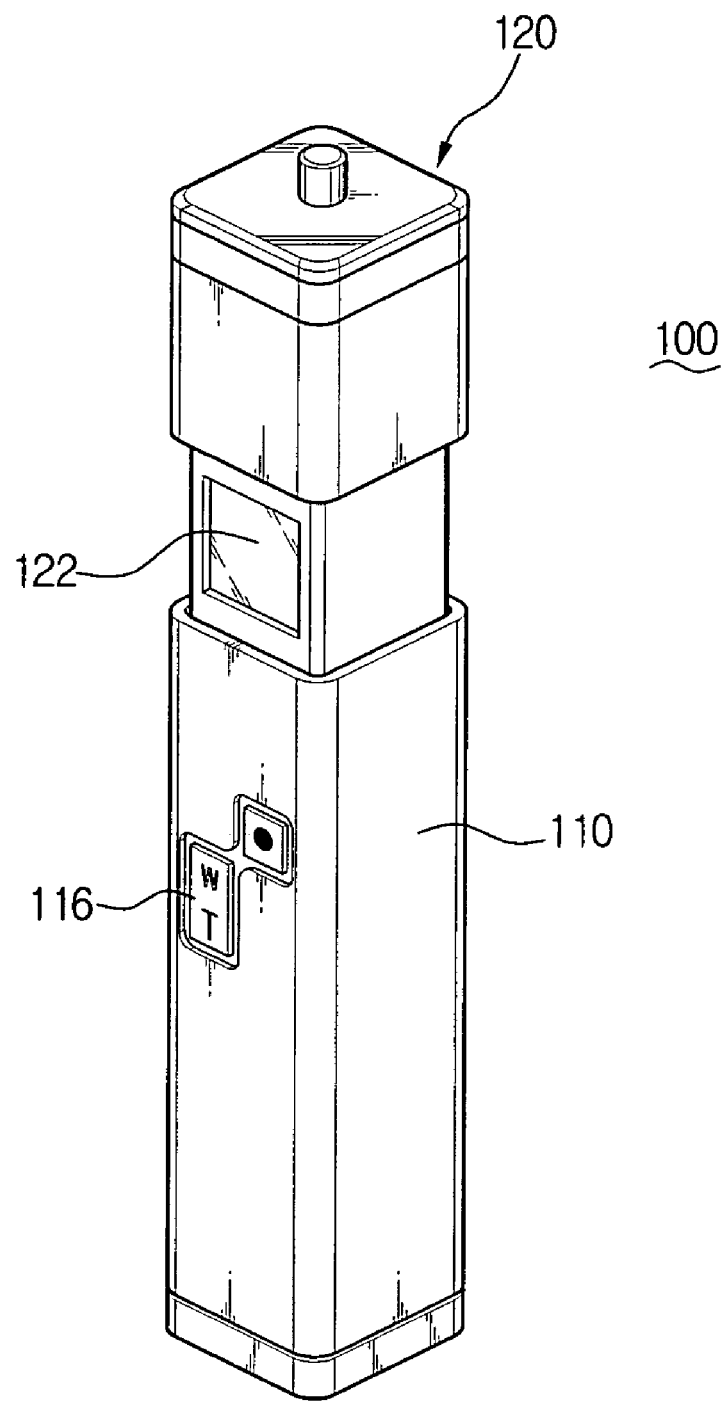
FIG. 3 is a perspective view of the digital camcorder of FIG. 1, with an image projection part exposed.

As shown in FIG. 3, the camcorder unit 110 comprises an operation switch 116 on a rear thereof for operating a record and zoom function.

The camera unit 120 comprises, as shown in FIG. 2, a lens part 121 for capturing an external image and an image projection part 122 disposed behind the lens part 121 for displaying the captured image. Preferably, a thin film transistor-liquid crystal display (TFT-LCD) can be employed for the image projection part 122.

When not in use, the camera unit 120 is received in the camcorder body 110. In order to use the camera unit 120, the power switch 111 provided on the front of the camcorder body 110 is pressed preferably for substantially about 2-3 seconds, such that the camera unit 120 protrudes out of the camcorder body 110 upon activation of the camera adjusting unit 200 formed in the camcorder body 110.

Figure 4:
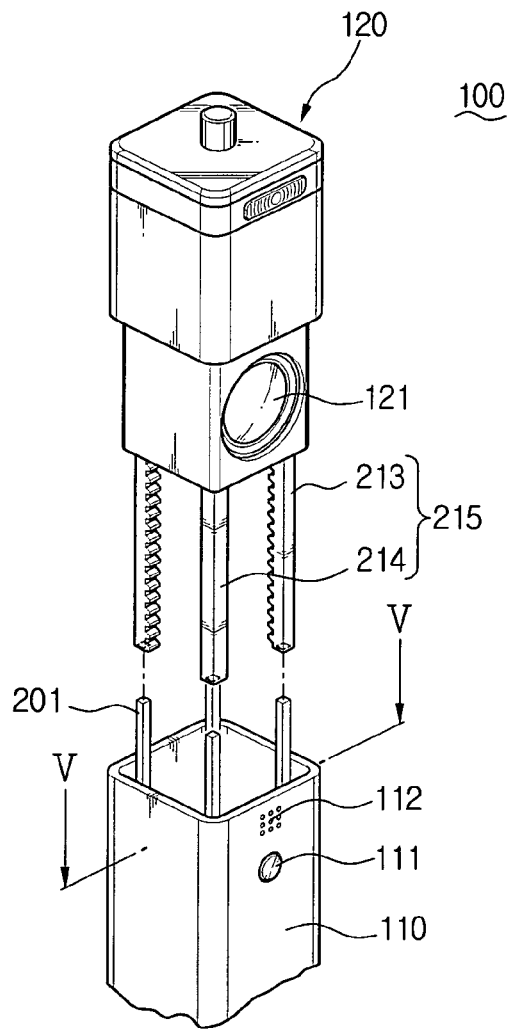
FIG. 4 is an exploded and perspective view of the digital camcorder of FIG. 1.
Figure 5:
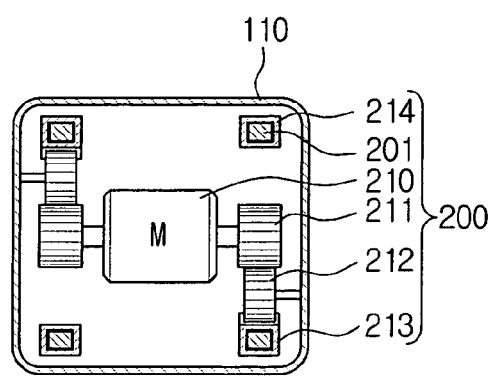
FIG. 5 is a schematic view of FIG. 4 cut along line V-V.

As shown in FIGS. 4 and 5, the camera adjusting unit 200 comprises a guide bar 201, the driving motor 210, a pinion 211, an idle gear 212, a power guide pipe 213 and a sliding guide pipe 214.

The guide bar 201 protrudes from the camcorder body 110 toward the camera unit 120 to guide the camera unit 120 in an ascending and descending motion. The guide bar 201 is preferably may be substantially polygonal shaped, as shown in FIGS. 4 and 5, however, it may also be formed as a circular column or other shapes.

When the power switch 111 is depressed for substantially about 2-3 seconds, the driving motor 210 rotates in a direction for elevating the camera unit 120. Subsequently, when the power switch 111 is re-pressed, the driving motor 210 rotates in the opposite direction descending the camera unit 120.

The pinion 211 and the idle gear 212 transmit the power generated by the driving motor 210 to the power guide pipe 213. More specifically, the pinion 211 is directly connected to the driving motor 210, and the idle gear 212 is mounted to the camcorder body 110 for idly pivoting with respect to the camcorder body 110. One end of the idle gear 212 is meshed with the pinion 211, and the other end thereof is meshed with the power guide pipe 213 for transmitting the power of the driving motor 210 to the power guide pipe 213.

Guide pipe assembly 215 has a power guide pipe 213 and a sliding guide pipe 214. The power guide pipe 213 has a rack gear thereon, and the camera unit 120 preferably has a plurality of the power guide pipe 213. The power guide pipe 213 is disposed corresponding to the guide bar 201 for receiving the guide bar 201. The power guide pipe 213 is preferably formed at each corner of the camcorder body 110, as shown in FIGS. 4-5 to correspond to the guide bar 201 which is extends upwardly. An exemplary embodiment of the present invention is shown in FIGS. 4 and 5, wherein the power guide pipes 213 are symmetrically formed to each other.

Preferably, a plurality of sliding pipes 214 are provided to the camera unit 120 in the same manner as the power guide pipe 213, however, the sliding pipes 214 do not comprise the rack gear for transmitting power. The sliding pipes 214 guide the camera unit 120 for ascending and descending movement for preventing the camera unit 120 from turning.

According to the above-structured digital camcorder 100, the lens part 121 and the image projection part 122 of the camera unit 120 are protected from physical damage such as scratching since the camera unit 120 is received in the camcorder body 110 when not in use. In addition, by using the digital storage medium such as a memory stick or the flash memory, space for the storage medium can be considerably saved, such that the digital camcorder 100 can be minimized to a size substantially about the size of a conventional lipstick container, thereby improving portability.

As can be appreciated from the above smaller and lighter digital camcorder 100, the user can operate the digital camcorder 100 for a long period of time without feeling discomfort.

While the invention has been shown and described with reference to certain embodiments thereof, it will be understood by those skilled in the art that various changes in form and details may be made therein without departing from the spirit and scope of the invention as defined by the appended claims.

What is claimed is:

1. A digital camera comprising:
   a camera body having a longitudinal axis, and a power switch disposed thereon,
   a camera unit being positionable into and out of a top portion of the camera body along the longitudinal axis of the camera body,
   a camera adjusting unit is disposed on the camera unit, and
   wherein the camera unit is substantially received in the camera body when not in use, and substantially protrudes out from the camera body when the power switch is pressed;
   wherein the camera adjusting unit comprises a plurality of guide bars mounted on the camera body for guiding extension and retraction of the camera unit;
   a plurality of guide pipes disposed on the camera unit for corresponding to the guide bars of the camera body for receiving the guide bars therein; and
   a driving motor for supplying power to the guide pipes; and
   the guide pipes comprise at least one power guide pipe having a rack gear thereon for transmitting power from the driving motor.

2. The digital camera of claim 1, wherein the top portion has a substantially rectangular shaped hollow recess.

3. The digital camera of claim 1, wherein the camera body is substantially rectangularly shaped.

4. The digital camera of claim 1, wherein the camera body has a microphone disposed thereon.

5. The digital camera of claim 1, wherein the camera unit has a lens part for capturing an external image and an image projection part disposed behind the lens part for displaying the captured image.

6. The digital camera of claim 5, wherein the image projection part is a thin film transistor-liquid crystal display.

7. A digital camera comprising:
   a camera body having a longitudinal axis, and a power switch disposed thereon,
   a camera unit being movably positionable into and out of a top portion of the camera body along the longitudinal axis,
   a camera adjusting unit is disposed on the camera unit having a plurality of guide bars mounted on the camera body for guiding the extension and retraction of the camera unit, a plurality of guide pipes are disposed on the camera unit for corresponding to the guide bars of the camera body for receiving the guide bars therein, and a driving motor for supplying power to the guide pipes, and
   wherein the camera unit comprises a camera adjusting unit, such that the camera unit is substantially received in the camera body when not in use, and substantially protrudes out from the camera body when the power switch disposed on the camera body is pressed; and the guide pipes comprise at least one power guide pipe having a rack gear thereon for transmitting power from the driving motor.

8. The digital camera of claim 7, wherein the top portion has a substantially rectangular shaped hollow recess.

9. The digital camera of claim 7, wherein the camera body is substantially rectangularly shaped.

10. The digital camera of claim 7, wherein the camera body has a microphone disposed thereon.

11. The digital camera of claim 7, wherein the camera unit has a lens part for capturing an external image and an image projection part disposed behind the lens part for displaying the captured image.

12. The digital camera of claim 11, wherein the image projection part is a thin film transistor-liquid crystal display.

13. A digital camera comprising:
   a camera body having a longitudinal axis, and a power switch disposed thereon,
   a camera unit being movably positionable into and out of a top portion of the camera body along the longitudinal axis,
   a camera adjusting unit is disposed on the camera unit having a plurality of guide bars mounted on the camera body for guiding the extension and retraction of the camera unit, a plurality of guide pipes disposed on the camera unit for corresponding to the guide bars of the camera body for receiving the guide bars therein, and the guide pipes comprise at least one power guide pipe having a rack gear thereon for transmitting power from a driving motor, and
   wherein the camera unit comprises a camera adjusting unit, such that the camera unit is substantially received in the camera body when not in use, and substantially protrudes out from the camera body when the power switch disposed on the camera body is pressed.

14. The digital camera of claim 13, wherein the camera body has a microphone disposed thereon.

15. The digital camera of claim 13, wherein the camera unit has a lens part for capturing an external image and an image projection part disposed behind the lens part for displaying the captured image.

16. The digital camera of claim 15, wherein the image projection part is a thin film transistor-liquid crystal display.

* * * * *